Figure 1:
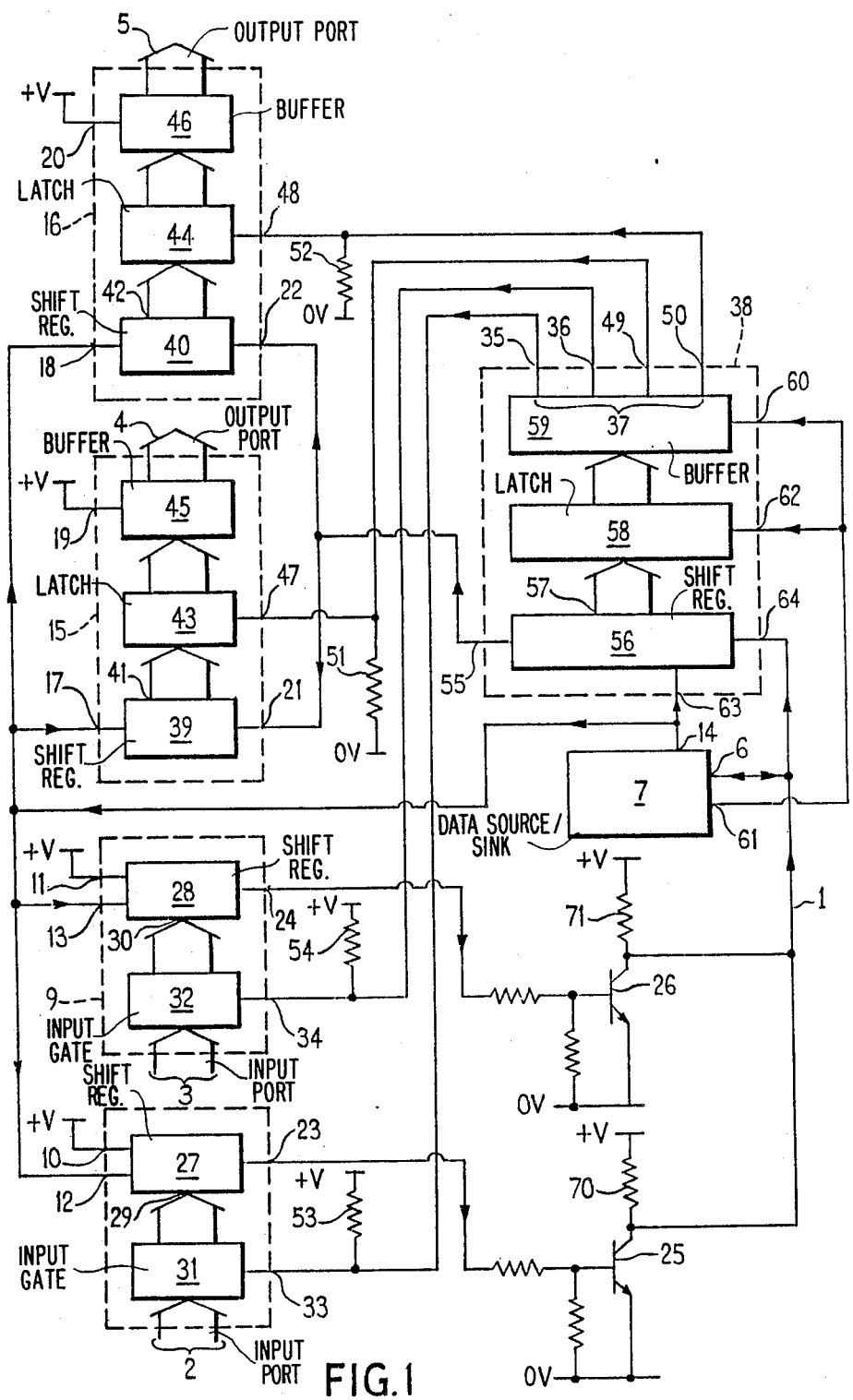

United States Patent [19]

Brier et al.

[11] Patent Number: 4,920,511

[45] Date of Patent: Apr. 24, 1990

[54] DATA PORT SELECTION

[75] Inventors: Geoffrey Brier; Mark W. Rayne, both of Cambridge, England

[73] Assignee: U.S. Philips Corporation, New York, N.Y.

[21] Appl. No.: 130,814

[22] Filed: Dec. 9, 1987

[30] Foreign Application Priority Data

Dec. 12, 1986 [GB] United Kingdom ................. 8629755

[51] Int. Cl.[5] ............................................ G06F 13/00
[52] U.S. Cl. ................................ 364/900; 364/927.92; 364/927.95
[58] Field of Search ... 364/200 MS File, 900 MS File; 377/64, 70, 75, 77

[56] References Cited

U.S. PATENT DOCUMENTS 4,174,536 11/1979 Misunas et al. ...................... 364/200
4,689,740 8/1987 Moelands et al. ................... 364/200

Primary Examiner—Gary V. Harkcom
Assistant Examiner—Michael A. Jaffe
Attorney, Agent, or Firm—Anne E. Barschall

[57] ABSTRACT

In order, for example, to expand the input and output of a microcomputer (7) having a serial input/output capability, a parallel data input port (2 or 3) or output port (4 or 5) is selected by clocking serial selection bits from a serial data line (1) into a first shift register (56) and then enabling a latch (58) for the register parallel output (57). This results in a change in level on a particular one of a set of a parallel output lines (35,36,49,50) which corresponds to the particular group of selection bits written, and hence to a particular port. If the selected port is an output port the change in level results in the strobing of a latch (43 or 44) corresponding to that port, and hence the transfer of the contents of a further shift register (39 or 40) corresponding to that port. These contents are previously written in from the serial data path (1), each further shift register (39,40) being connected in cascade with the first register. If the selected port is an input port the change in level results in the enabling of a gate (31 or 32) corresponding to that port, and hence to the transfer of the port information to a shift register (27 or 28) corresponding to that port, whence it is subsequently clocked out to the serial data path via a respective transistor (25 or 26).

23 Claims, 3 Drawing Sheets

DATA PORT SELECTION

DESCRIPTION

This invention relates to a method of selecting a parallel data port from a plurality of such ports for data transfer between the selected port and a serial data path, in which method a serial train of selection bits identifying the port to be selected is transmitted on the data path to a serial data input of a clock first shift register and stored in said first register, after which couplings from a parallel data output of said first register effect said selecting. The invention also relates to apparatus for implementing such a method.

The input and/or output facilities of a data processing device such as a microcomputer are sometimes inadequate for a particular application. For example, more parallel input and/or output ports may be required than are actually provided. In this context, the port may be an input port, an output port, or a bidirectional port. Moreover the port itself could be constructively joined to further data processing elements, storage elements and the like, thereby effectively realizing a station in a serial-line network or a peripheral to the serial interconnection of the microcomputer. One or more of such peripherals could, in fact, themselves be a microcomputer. A method according to the preamble has been disclosed in European Patent Specification 51332, corresponding U.S. Pat. No. 4,689,740. Although the known art, colloquially called $I^2C$ (inter I.C.) system has found appreciable acceptance, it has been found to be rather slow-performing.

It is an object of the present invention to enable a plurality of parallel data input and/or output ports to be coupled to a single serial data path in such a way that data transfer between selected ports and the path can take place and the selection can be achieved by means of selecting bits also transmitted on the path. Thus, for example, the input and/or output facilities of a microcomputer having a limited number of parallel data ports but which also has a serial data input/output facility can be extended by coupling further parallel data input or output ports to the serial data input/output.

It is a further object of the invention to enable a higher velocity communication system to be provided. It is a still further object of the invention to enable a less expensive system to be provided, in that the first register may be centralised instead of distributed as it is according to the $I^2C$ organisation.

According to one aspect the invention provides a method of selecting a parallel data port from a plurality of such ports for data transfer between the selected port and serial data path, in which method a serial train of selection bits identifying the port to be selected is transmitted on the data path to a serial data input of a clocked first shift register and stored in said first register, after which couplings from a parallel data output of said first register effect said selecting, characterised in that said couplings are to enable control inputs of respective further couplings between each port of the plurality and stages of a further shift register to a serial data terminal of which said serial data path is coupled and, in order to effect said selecting, the first-mentioned said couplings are themselves enabled, thereby enabling, on the basis of the selection bits stored, that further coupling which corresponds to the port identified by the selection bits stored.

According to another aspect the invention provides a method of selecting a parallel data port from a plurality of such ports for data transfer between the selected port and a serial data path, in which method a serial train of selection bits identifying the port to be selected is transmitted on the data path to a serial data input of a clocked first shift register and stored in said first register, after which couplings from a parallel data output of said first register effect said selecting, characterised in that various control outputs of said first shift register enable control inputs of respective further couplings between each port of the plurality, and stages of a further shift register to a serial data terminal of which said serial data path is coupled are themselves enabled, thereby enabling, on the basis of the selection bits stored, that further coupling which corresponds to the port identified by the selection bits stored.

Each said further coupling may be between the corresponding port of the plurality and stages of a respective said further shift register, the port to be selected may be an output port, the first shift register and the further shift register corresponding to said output port may be connected in cascade and have commoned clock pulse inputs, and a serial train of data bits may be appended to the serial train of selection bits and be stored in the further shift register corresponding to said output port prior to the enabling of said further coupling. This last feature in particular can speed up the outputting of data.

According to yet another aspect the invention provides apparatus for selecting a parallel data port from a plurality of such ports and transferring data between the selected port and a serial data path, comprising a first shift register to a serial data input of which the serial data path is coupled, a further shift register corresponding to each port to the plurality, which shift register has a serial data terminal coupled to the serial data path and its stages coupled to the corresponding port, means for clocking each of the first and further shift registers, further couplings from a parallel data output of the first shift register to enable control inputs of each coupling between the stages of a said further shift register and the corresponding port, and means for enabling said further couplings to thereby select and enable a specific said coupling between the stages of a said further shift register and the corresponding port on the basis of the contents of said first shift register.

Figure 2:
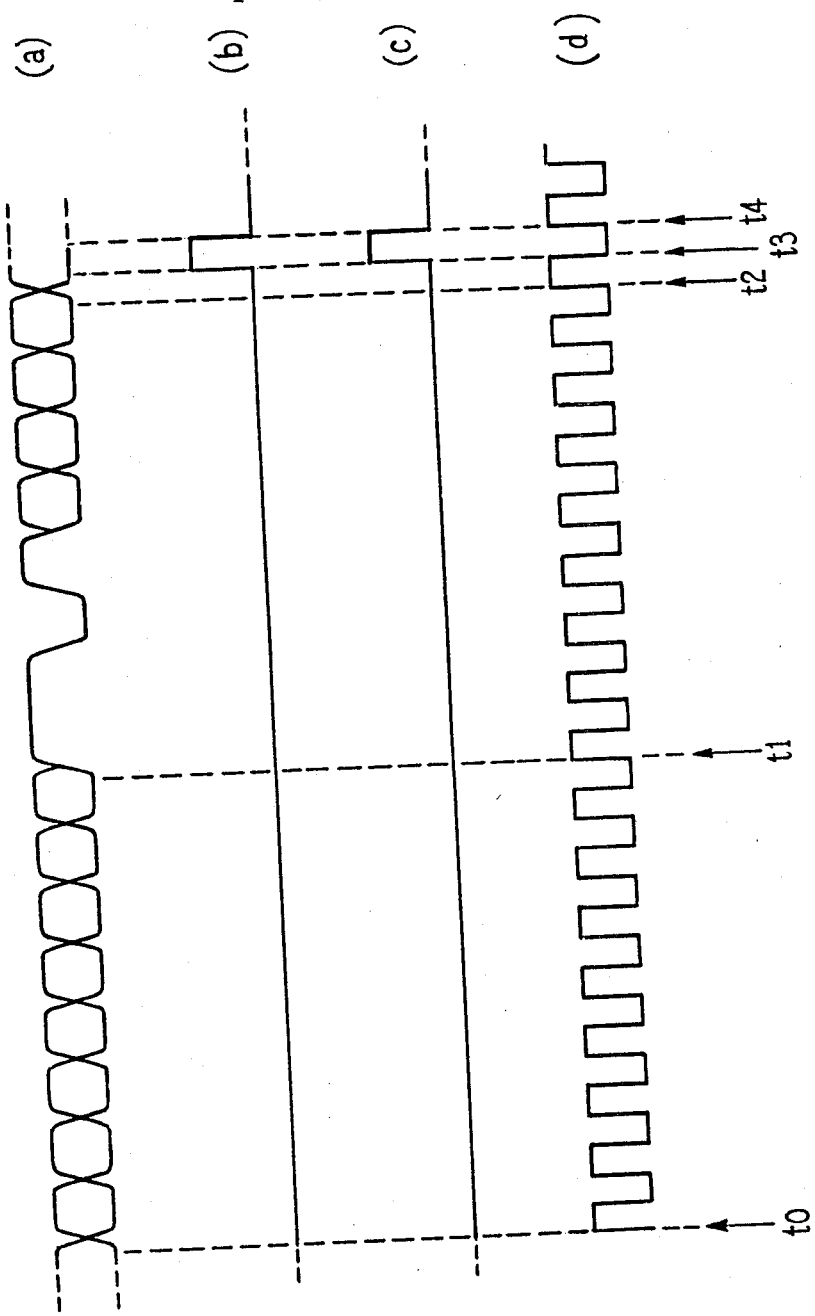
Figure 3:
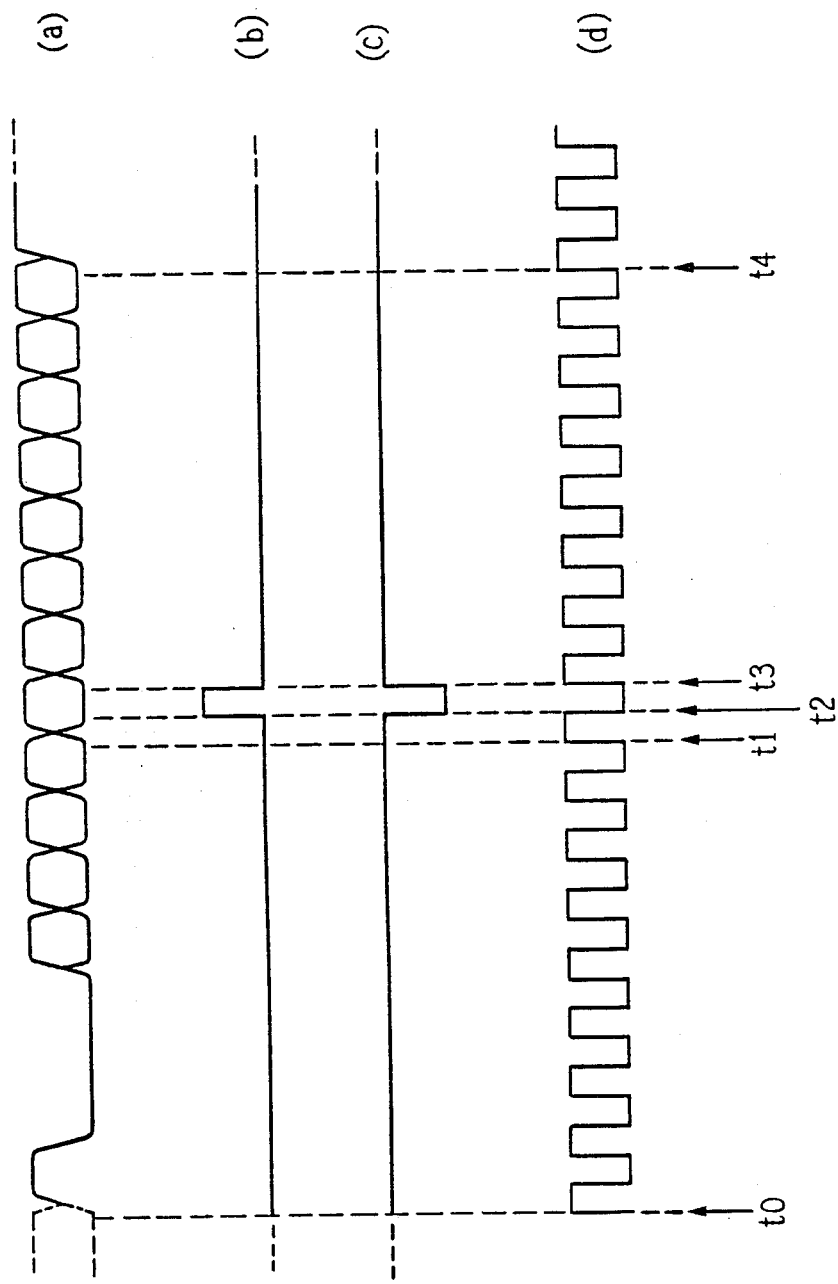

An embodiment of the invention will be described, by way of example, with reference to the accompanying diagrammatic drawings in which:

FIG. 1 is a diagram of apparatus for selecting a parallel data port from a plurality of such ports and transferring data between the selected port and a serial data path, FIG. 2(a,b,c and d) is a timing diagram illustrating the operation of the apparatus of FIG. 1 in a first mode, and FIG. 3(a,b,c and d) is a timing diagram illustrating the operation of the apparatus of FIG. 1 in a second mode.

FIG. 1 is a diagram of apparatus for transferring data between a bidirectional serial data path in the form of a line 1 and a parallel data port selected from a pair of parallel data input ports 2 and 3 respectively and a pair of parallel data output ports 4 and 5 respectively. The line 1 is connected to a serial data terminal 6 of a data source/sink 7, for example to the serial data input/output terminal of a microcontroller of the kind available under the type number MAB 8051 described in the book Microprocessors, Microcontrollers and Peripherals, Data Handbook, Integrated Circuits, Philips Electronic Components and Materials Division, pages 43-75, the Netherlands, 1985.

The input ports 2 and 3 are constituted by the parallel data inputs of parallel-in/serial-out shift register ICs 8 and 9 respectively, for example those available under the type number (same manufacturer) 74HC165, these ICs also having serial data inputs 10 and 11 respectively which are connected to the positive supply rail (+V; logic "1"), and clock pulse inputs 12 and 13 respectively which are fed from a clock pulse output 14 of the source/sink 7. Similarly the output ports 4 and 5 are constituted by the parallel outputs of serial-in/parallel-out shift register ICs 15 and 16 respectively, for example shift-and-store registers available under the type number 74HC4098, these ICs having clock pulse inputs 17 and 18 respectively which are fed from the output 14 and output-enable inputs 19 and 20 respectively which are connected to the positive supply rail. Each of the parallel-in/serial out shift register ICs 8 and 9 comprises an actual shift register portion, 27 and 28 respectively, to the parallel inputs 29 and 30 respectively of which ports 2 and 3 respectively are coupled via input gates 31 and 32 respectively. The input gates 31 and 32 are controlled by control signals fed to inverting parallel-load inputs 33 and 34 respectively from respective bit lines 35 and 36 of the parallel output 37 of a further serial-in/parallel-out shift register IC 38. Each of the serial-in/parallel-out shift register ICs 15 and 16 comprises an actual shift register portion, 39 and 40 respectively, the parallel outputs 41 and 42 respectively of which are coupled to the ports 4 and 5 respectively by cascade combinations of a latch, 43 and 44 respectively, and an output buffer, 45 and 46 respectively. The latches 43 and 44 are controlled by control signals fed to strobe inputs 47 and 48 respectively from further respective bit lines 49 and 50 of the parallel output 37 of register IC 38. These bit lines are connected to the negative supply rail (0V; logic "0") via pull-down resistors 51 and 52 respectively. The bit lines 35 and 36 are connected to the positive supply rail (+V; logic "1") via pull-up resistors 53 and 54 respectively. The values of the resistors 51-54 are chosen to be high relative to, for example 100 to 1000 times, the source resistance at the corresponding output 35,36,49 or 50 of register IC 38. These resistors may each have a value of, for example, 10 Kohms, and the supply voltage may be, for example 5 volts.

Serial data inputs 21 and 22 of the register ICs 15 and 16 respectively are connected to a serial data output 55 of register IC 38 a serial data input 64 of which is connected to the line 1. Register IC 38 therefore couples the line 1 to these serial data inputs. Inverting serial data outputs 23 and 24 of the register ICs 8 and 9 respectively are coupled to the line 1 via npn transistors 25 and 26 respectively which are each connected in common emitter configuration.

Like the register ICs 15 and 16, register IC 38 (which may also be of the kind available under the type number 74HC4098) comprises an actual shift register portion 56 the parallel output 57 of which is coupled to the parallel output 37 via the cascade combination of a latch 58 and an output buffer 59. Buffer 59 has 3-state outputs (high, low and connected to a high impedance) this being the reason for the provision of the resistors 51-54. When the potential at an output-enable input 60 thereof is logic "1" data in the latch 58 appears at the parallel output 37. This output-enable input is connected to a further output 61 of the data source/sink 7, as is a strobe signal input 62 of the latch 58. A clock input 63 of register IC 38 is connected to the clock pulse output 14 of the source/sink 7.

FIG. 2 is a timing diagram illustrating the writing of a byte of information to output port 5, it being assumed that each of the register ICs 8,9,15,16 and 38 is 8-bits wide and that the output bit lines 35,36,49 and 50 of register IC 38 correspond to the last stage, the last stage but one, the last stage but two and the last stage but three respectively thereof. It is also assumed that data source/sink 7 is in the form of an appropriately programmed microcomputer having a serial data input/output terminal 6, a clock pulse output terminal 14, and a further output terminal 61, this last being, for example, a single bit line of one of its ports. FIG. 2a shows the data generated by computer 7 on line 1 in FIG. 1, FIG. 2b the signal it generates as its output 61, FIG. 2c the signal which appears on output bit line 50 of register IC 38, and FIG. 2d the clock signal generated by computer 7 at its output 14. At time t0 computer 7 starts to generate serially at its serial data input/output 6, i.e. on line 1, the 8-bit byte which is to be written to port 5, this byte being shifted into register 56 by means of successive clock pulses and being contained completely therein at time t1. At this time t1 computer 7 starts to generate serially on line 1 the bit sequence 1101XXXX, which is the bit sequence required at the parallel output 37 of shift register IC 38 if output port 5 is to be addressed, the input gates 31 and 32 of the ICs 8 and 9 requiring logic "0" on the parallel load pulses 33 and 34 if they are to be enabled, and the latches 43 and 44 of the ICs 15 and 16 requiring logic "1" on the strobe inputs 47 and 48 if they are to latch the contents of the registers 39 and 40. During the time t1-t2 this bit sequence is shifted into register 56 and the previous contents of register 56, i.e. the byte to be written to port 5, is shifted out via output 55 and into both registers 39 and 40 via inputs 21 and 22. At time t3, when the said byte is wholly within the registers 39 and 40 and the said bit sequence is wholly within the register 56, computer 7 generates logic "1" on its output 61 (FIG. 2b) causing the contents of register 56 to be latched into latch 58 and to appear at parallel output 37, i.e. to cause the bits 1,1,0 and 1 to appear on lines 35,36,49 and 50 respectively. (The bits previously on these lines were 1,1,0 and 0 respectively due to the high resistance state of the output 37 because of its logic "0" output enable signal and the presence of the resistors 51-54). Thus the latch 44 is strobed by the logic "1" which appears on line 50 (FIG. 2c), transferring the byte in register 40 to output port 5, whereas latch 43 is unaffected and the gates 31 and 32 remain in their blocked state. At time t4 computer 7 returns the level on its output 61 to logic "0", causing the output buffer 59 to return to its high-resistance state and therefore the level on the bit line 50 to return to "0". The byte remains in latch 44 and hence at the output port 5. Obviously if the byte had been required to be written to port 4 instead of port 5 the bit sequence 1110XXXX would have had to have been generated on the line 1, instead of the sequence 1101XXXX, resulting in the pulse generated on the bit line 50 (FIG. 2c) being replaced by a pulse on the line 49.

FIG. 3 is a timing diagram illustrating the writing of a parallel byte presented to input port 3 onto the serial data line 1. FIG. 3a shows the data occurring on line 1, FIG. 3b the signal computer 7 generates on its output 61, FIG. 3c the signal which appears on output bit line 36 of IC 38, and FIG. 3d the clock signal generated by computer 7 on its output 14. At time t0 computer 7 starts to generate serially at its serial data input/output 6, i.e. on line 1, the bit sequence 1000XXXX, i.e. the bit sequence required at the parallel output 37 of shift register IC 38 is input port 3 is to be addressed. During the line t0-t1 this bit sequence is shifted into the register 56. At time t2, when the complete sequence is in register 56, computer 7 generates logic "1" on its output 61 (FIG. 3b) causing the contents of register 56 to appear at parallel output 37, i.e. to cause the bits 1,0,0 and 0 to appear on lines 35,36,49 and 50. There is therefore no change in the levels on the lines 35,49 and 50, but the level on line 36 changes from "1" to "0" (FIG. 3c), i.e. to the parallel load level of shift register IC 9 to the relevant input 34 of which it is connected. The byte at input port 3 is therefore loaded into shift register 28 whence it is subsequently shifted out in inverted form to serial output 24 during the time t3-t4, inverted once again by the common-emitter transistor 26, and applied to line 1 and hence to the serial data input/output 6 of computer 7. The computer returns the level on its output 61 to "0" at time t3 causing in turn the level on bit line 36 to return to "1", disabling once again the parallel loading of register 28. Because the serial data input 11 of register IC 9 is connected to logic "1" the level on line 1 after time t4 remains at "1" unless further data is applied to it, because transistor 26 is then cut off. (The values of the collector load resistors 70 and 71 of the transistors 25 and 26, which resistors may obviously be replaced by a single pull-up resistor of value equal to that of the parallel combination of these resistors, are chosen to be high relative to, for example 100 to 1000 times, the "on" resistance of each of the transistors 25 and 26 and the source resistance at the serial data output 6 of microcomputer 7. Line 1 therefore effectively performs a wired AND function on the logic levels generated at the collectors of the transistors 25 and 26 and at the output 6 (the same as wired OR if it is assumed that ground potential corresponds to logic "1" and +V corresponds to logic "0"). Obviously if the byte at input port 2 rather than that on port 3 had been required to be presented serially on line 1 the computer would have had to generate the sequence 0100XXXX rather than the sequence 1000XXXX during the time t0-t1, resulting in the pulse generated on the line 36 (FIG. 3c) being replaced by a pulse on the line 35.

Obviously the four unused bit lines (not shown) at parallel output 37 of register IC 38 could be used to control respective further input or output ports in a similar way, if desired, the relevant "don't care" bits in the bit sequences quoted above then having to be given the appropriate values to ensure that the corresponding ports are or are not addressed as required. If more than eight ports are required to be controlled the parallel output 37 can be extended by connecting another shift register IC in cascade with IC 38, extending the address bit sequences generated by computer 7 accordingly. Alternatively the parallel output 37 could be coupled to the strobe or parallel load inputs of the various shift register ICs via a decoder for the various possible bit combinations at output 37, enabling up to 256 ports to be controlled by means of this 8-bit parallel output. Conversely the number of output and/or input ports may be reduced; indeed the arrangement may contain only output ports or only input ports. Especially if it contains only output ports, instead of feeding the registers 39 and 40 from the serial output 55 of register 56 the serial input 64 of register 56 could be fed from the serial data output (not shown) of one of the registers 39 and 40 provided that the order in which the two bytes shown in FIG. 2a are generated is then reversed.

The clock signals of FIGS. 2d and 3d are shown as being continuous. If serial data source/sink 7 is a suitably programmed microcomputer, for example of the kind available under the type number MAB8051, this clock signal may in fact be generated as an integral part of the serial input/output mechanism of the device, in which case pauses may occur in this clock signal at certain times. For example, in FIG. 2 a pause may occur in the clock signal of FIG. 2d immediately after the rising edge at t1, (with a corresponding pause in the succession of data bits of FIG. 2a) while the microcomputer prepares to output the second byte shown. Furthermore, the clock signal of FIG. 2d may in fact remain in the high state after the rising edge at t2. Similarly, in FIG. 3 a pause may occur in the clock signal of FIG. 3d immediately after the rising edge at t1, while the microcomputer prepares to input the second byte shown, and the clock signal may remain in the high state after the rising edge at t4.

As described, a respective shift register 31,32,39 or 40 is provided for each of the input and output ports 2,3,4 and 5. This is often an advantage, especially when the various ports are significantly separated from each other in space, because if each such shift register is positioned close to the relevant port only three signal lines (strobe, serial data and clock) are required between each of the port/register combinations and the combination of the units 7 and 38. However, if providing more such signal lines is of no or little consequence it will be evident that a single such register may be shared between more than one port. For example, in FIG. 1 register 40 may be omitted, the parallel input to latch 44 then being connected to the parallel output of register 39. As another example register 28 may be omitted, the parallel output of gate 32 being connected instead to the parallel input of register 27. Indeed, a single register having both a parallel data input and a parallel data output may be substituted for all the registers 31,32,39 and 40, provided that it is such that the direction of shift of data through it is reversible.

From reading the present disclosure, other modifications will be apparent to persons skilled in the art. Such modifications may involve other features which are already known in the design, manufacture and use of systems and devices and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

We claim:

1. Apparatus for selecting one of a plurality of parallel data ports and for transferring data between the one port and a serial data path, the apparatus comprising:

(a) a first shift register having a serial data input coupled to the serial data path and having a parallel output;

(b) at least one respective further shift register for coupling with a respective one of the parallel data ports and having a respective serial data terminal coupled to the serial data path and having a plurality of stages, the serial data terminal being one of an input and an output, according to whether the further shift register is for coupling with an output or an input parallel data port, respectively;

(c) a plurality of respective means for coupling the stages of said at least one further shift register to the plurality of parallel data ports, there being one respective means for coupling for each of the plurality of parallel data ports and each of said respective means for coupling having a respective enable control input;

(d) further means for coupling the parallel output of the first shift register to the enable control inputs of the respective means for coupling; and (e) means for enabling said further means for coupling to select and enable one of said respective means for coupling, that corresponds to the one port, according to contents of the first shift register.

2. The apparatus of claim 1 comprising: a plurality of respective further shift registers, one for each of the plurality of parallel data ports, each of the respective further shift registers having a respective serial data terminal which is either an input or an output, according to whether the respective further shift register is an output or an input, respectively, which terminal is coupled with the serial data path.

3. The apparatus of claim 1, wherein (a) the plurality of parallel data ports comprises first and second parallel input ports; and (b) the apparatus further comprises (I) first and second further shift registers corresponding, respectively, to the first and second parallel input ports, the first and second further shift registers each comprising:

(i) a respective serial data terminal which is a respective serial data output; and (ii) a respective serial data input connected to a respective logic level; and (II) an AND-function circuit coupling the serial data outputs of the first and second further shift registers to the serial data path, each of the respective logic levels connected to the respective serial data inputs being such as to result in application of a logic level '1' to a corresponding input of the AND-function circuit, after the respective logic level is clocked through the respective further shift registers.

4. Apparatus as claimed in claim 3, wherein the AND-function circuit is a wired AND-function circuit of which the serial data path forms part.

5. The apparatus of claim 4 further comprising a serial data source having an output coupled to the serial data path via a further input of the AND-function circuit.

6. Apparatus as claimed in claim 3, including a serial data source an output of which is coupled to the serial data path via a further input of the AND-function circuit.

7. The apparatus of claim 3 wherein (a) the plurality of respective first coupling means comprises first and second first coupling means corresponding respectively to the first and second parallel input ports, each of the first and second first coupling means comprising a gate having an enable control input.

8. The apparatus of claim 1 wherein (a) the plurality of parallel data ports comprises a parallel input port;

(b) the at lease one further shift register comprises a respective further shift register corresponding to the input port and comprising:

(i) a respective serial data terminal which is a respective serial data output; and (ii) a serial data input for coupling with a logic level; and (c) the apparatus further comprises:

(i) an AND-function circuit having a first input for coupling the respective serial data output to the serial data path, the logic level being such that, after the logic level has been clocked through the respective further shift register the logic level will result in application of a logic '1' to the first input of the AND-function circuit; and (ii) a serial data source having an output coupled to the serial data path via a second input of the AND-function circuit.

9. Apparatus as claimed in claim 8, wherein the AND-function circuit is a wired AND-function circuit of which the serial data path forms part.

10. The apparatus of claim 1 wherein (a) at least one of the respective means for coupling comprises a latch and a buffer in cascade, the latch comprising a strobe signal input and the buffer comprising an output enable signal input; and (b) said means for enabling comprises means for applying a strobe signal to the strobe signal input of the latch and an output enable signal to the output enable signal of the buffer.

11. The apparatus of claim 10 wherein:

(a) the plurality of data ports comprises at least one output port; and (b) the first shift register and the further respective shift register, corresponding to the at least one output port, are coupled in cascade.

12. The apparatus of claim 1 wherein:

(a) the plurality of data ports comprises at least one output port;

(b) the at least one further shift register comprises at least one respective further shift register corresponding to respective ones of the at least one output port; and (c) the first shift register and the respective further shift register are coupled in cascade.

13. The apparatus of claim 1 wherein:

(a) the plurality of parallel data ports comprises at least one input port and one output port; and (b) the respective first coupling means corresponding to the at least one input port comprises a gate with an enable control input.

14. The apparatus of claim 1 wherein (a) the plurality of parallel data ports comprises at least one input port and one output port.

15. The apparatus of claim 14 wherein:

(a) the respective first coupling means corresponding to the at least one input port comprises a gate with an enabled control input; and (b) the respective further shift register corresponding with the output port is in cascade with the first shift register.

16. A method for selecting one of a plurality of parallel data ports for the purpose of transferring data between the one parallel port and a serial data path, the method comprising the steps of:
  (a) transmitting a serial train of selection bits, which identify the one port on the serial data path, to a serial data input of a first shift register;
  (b) storing the selection bits in the first shift register;
  (c) first enabling couplings from a parallel data output of said first shift register; and
  (d) as a result of said first enabling, second enabling at least one control input of respective further couplings, which further couplings couple the plurality of parallel data ports to stages of at least one further shift register, which further shift register has a serial data terminal coupled with the serial data path, the serial data terminal being one of an input and an output, according to whether a respective data port is an output or an input, respectively, so that the one port is coupled to the serial data path.

17. The method of claim 16 wherein:
  (a) said first enabling step comprises enabling various control outputs of said first shift register; and
  (b) said second enabling step comprises enabling the stages of the further shift register.

18. The method of claim 16 wherein
  (a) there are
    (i) a plurality of respective further shift registers, one for each of the plurality of parallel data ports; and
    (ii) a plurality of respective further couplings, each coupling a respective one of the plurality of parallel data ports to the stages of a respective one of the plurality of further shift registers, each of the plurality of further couplings having a respective control input; and
  (b) said second enabling step comprises enabling the respective control input of the respective further coupling corresponding to the one port.

19. The method of claim 18, wherein
  (a) the one port is an output port;
  (b) the first shift register and the respective further shift register corresponding to the one port are connected in cascade and have common clock inputs;
  (c) the method further comprises the steps of:
    (i) appending a serial train of data bits to the serial train of selection bits; and
    (ii) second storing the serial train of selection bits in the respective further shift register corresponding to the one port prior to said second enabling step.

20. The method of claim 18, wherein:
  (a) the one port is an input port; and
  (b) the method further comprises the step of:
    (i) clocking data from the respective further shift register, corresponding to the one port, onto the serial data path, after said second enabling step.

21. The method of claim 16, wherein:
  (a) the one port is an output port; and
  (b) said second enabling step comprises
    (i) applying a strobe signal to a strobe input of a latch circuit included in one of said further couplings corresponding to the one port; and
    (ii) applying an output enable signal to an output enable signal input of a buffer cascaded with said latch circuit and included in said one further coupling.

22. The method of claim 16, wherein:
  (a) the one port is an input port; and
  (b) the second enabling step comprises enabling a control input of a gate included in said further coupling.

23. Apparatus for selecting one port from a plurality of parallel data ports (2, 3, 4, 5) and for transferring data between the one port and a serial data path, the apparatus comprising:
  (a) a first shift register (56) having a serial data input coupled to the serial data path;
  (b) a plurality of respective first means for coupling (31, 32, 43/45, 44/46), one of each of the parallel data ports, each having a respective control input, the plurality of first means for coupling comprising:
    (i) for each of the parallel data ports which is an input port, a respective gate with an enable control input; and
    (ii) for each of the parallel data ports which is an output port, a respective cascade of a respective latch and a respective buffer, each respective latch having a strobe signal input, each respective buffer having an output enable signal input;
  (c) a plurality of further respective shift registers (27, 28, 39, 40), one for each of the plurality of parallel data ports, each of the further shift registers having:
    (i) a respective serial data terminal (21, 22, 23, 24), comprising:
      (A) a respective input, for each further shift register coupled with one of the parallel data ports which is an output port, or
      (B) a respective output for each further shift register coupled with one of the parallel data ports which is an input port,
      which terminal is coupled to the serial data path; and
    (ii) a respective plurality of stages coupled with the respective data port via the respective first means for coupling;
  (d) means (14) for clocking each of the first and further shift registers, so that for each output port, the first and respective further shift registers are cascaded with a common clock;
  (e) second means for coupling a parallel output (35, 36, 49, 50) of the first shift register to the respective control inputs of the plurality of first means for coupling; and
  (f) means for enabling the second means for coupling to select and enable one of the first means for coupling, which one of the first means for enabling corresponds to the one parallel data port, and which selecting and enabling is on the basis of the contents of the first shift register.

* * * * *